(12) United States Patent
Mammen et al.

(10) Patent No.: US 6,890,253 B2
(45) Date of Patent: May 10, 2005

(54) SLAT AND SIEVE ASSEMBLY

(75) Inventors: David W. Mammen, Mendota, IL (US); Dennis J. Jones, Mendota, IL (US); Donald W. Bickel, Peru, IL (US)

(73) Assignee: HCC, Inc., Mendota, IL (US)

( * ) Notice: Subject to any disclaimer, the term of this patent is extended or adjusted under 35 U.S.C. 154(b) by 0 days.

(21) Appl. No.: 10/336,418

(22) Filed: Jan. 3, 2003

(65) Prior Publication Data

US 2003/0130019 A1 Jul. 10, 2003

Related U.S. Application Data

(60) Provisional application No. 60/412,912, filed on Sep. 23, 2002, and provisional application No. 60/346,339, filed on Jan. 7, 2002.

(51) Int. Cl.[7] ............................ A01F 12/32; B07B 1/00
(52) U.S. Cl. ..................................................... 460/101
(58) Field of Search .................. 460/97, 101, 102, 460/119, 120

(56) References Cited

U.S. PATENT DOCUMENTS

| | | | |
|---|---|---|---|
| 694,496 A | 3/1902 | Rumely | |
| 735,016 A | 7/1903 | Ditch et al. | |
| 784,134 A | 3/1905 | Block | |
| 784,135 A | 3/1905 | Block | |
| 784,828 A | 3/1905 | Armstrong | |
| 789,966 A | 5/1905 | Ditch et al. | |
| 2,011,365 A | 8/1935 | Kuballe | |
| 2,058,381 A | 10/1936 | Lindgren | |
| 2,105,986 A | 1/1938 | Petersen | |
| 2,253,296 A * | 8/1941 | Holtzman | 209/394 |
| 2,335,416 A | 11/1943 | Holtzman | |
| 2,428,294 A | 9/1947 | Ross | |
| 2,883,052 A * | 4/1959 | Shovlain | 209/394 |
| 3,194,397 A | 7/1965 | Taege | |
| 3,334,744 A * | 8/1967 | James et al. | 209/394 |
| 3,472,377 A | 10/1969 | Payne | |
| 4,511,466 A | 4/1985 | Jones et al. | |
| 5,176,574 A | 1/1993 | Matousek et al. | |
| 5,462,174 A * | 10/1995 | Truckenbrod et al. | 209/394 |
| 5,816,912 A * | 10/1998 | Clark et al. | 460/114 |
| 5,984,777 A * | 11/1999 | Kuchar | 460/101 |
| 6,053,812 A * | 4/2000 | Loewen et al. | 460/101 |
| 6,468,154 B1 * | 10/2002 | Eggenhaus et al. | 460/101 |
| 6,579,172 B2 * | 6/2003 | Lauer | 460/101 |
| 6,585,584 B2 * | 7/2003 | Buermann | 460/101 |

FOREIGN PATENT DOCUMENTS

| | | | |
|---|---|---|---|
| FR | 2549345 | * | 1/1985 |
| GB | 2054335 | * | 2/1981 |

OTHER PUBLICATIONS

Farm Show Magazine, "Remote–controlled Combine Sieve Adjuster", vol. 23, issue 3, p. 4 (1999).*

* cited by examiner

Primary Examiner—Thomas B. Will
Assistant Examiner—Nathan Mammen
(74) Attorney, Agent, or Firm—Michael Best & Friedrich LLP

(57) ABSTRACT

A slat and a sieve assembly. The sieve assembly comprises a frame, a slat supported by the frame, and a rotational drive mechanism supported by the frame. In some constructions and in some aspects, the slat extends at least 180° about an axis and has a cross-section having a uniform radius in relation to the axis. The slat includes spaced finger-like indentations being defined on an edge of the slat. The slat is couplable to the rotational drive mechanism for rotation about the axis. In some constructions and in some aspects, the rotational drive mechanism includes a pinion connected to the end of the slat, and a drive shaft including a worm gear engaging the pinion and rotatably supported by the frame to rotate about a drive axis. In some constructions and in some aspects, the slat may include a cross-section having a first adjustment cavity and a second adjustment cavity. The sieve assembly may also include a plurality of slats extending substantially parallel to one another with a space being defined between adjacent slats.

47 Claims, 15 Drawing Sheets

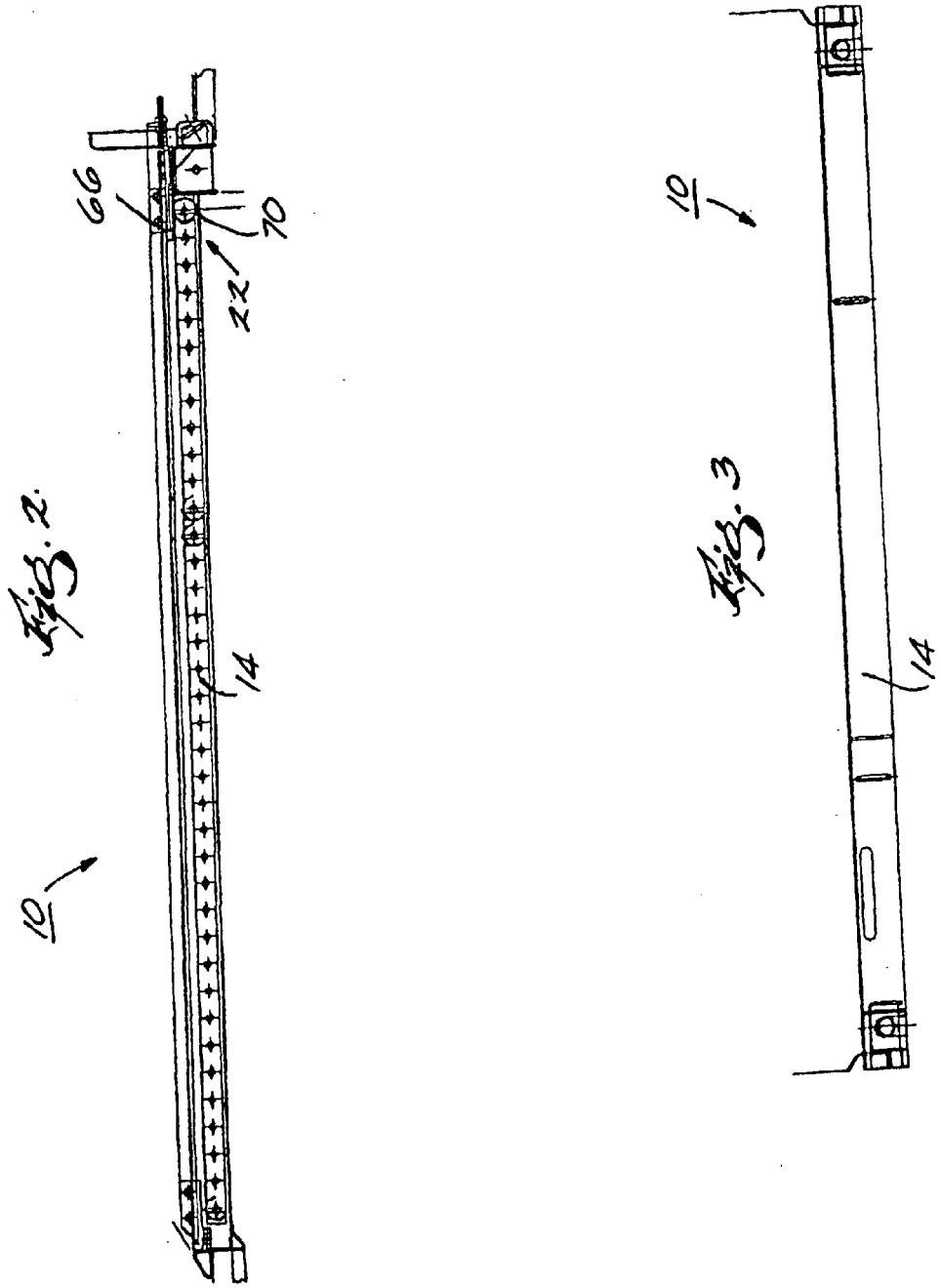

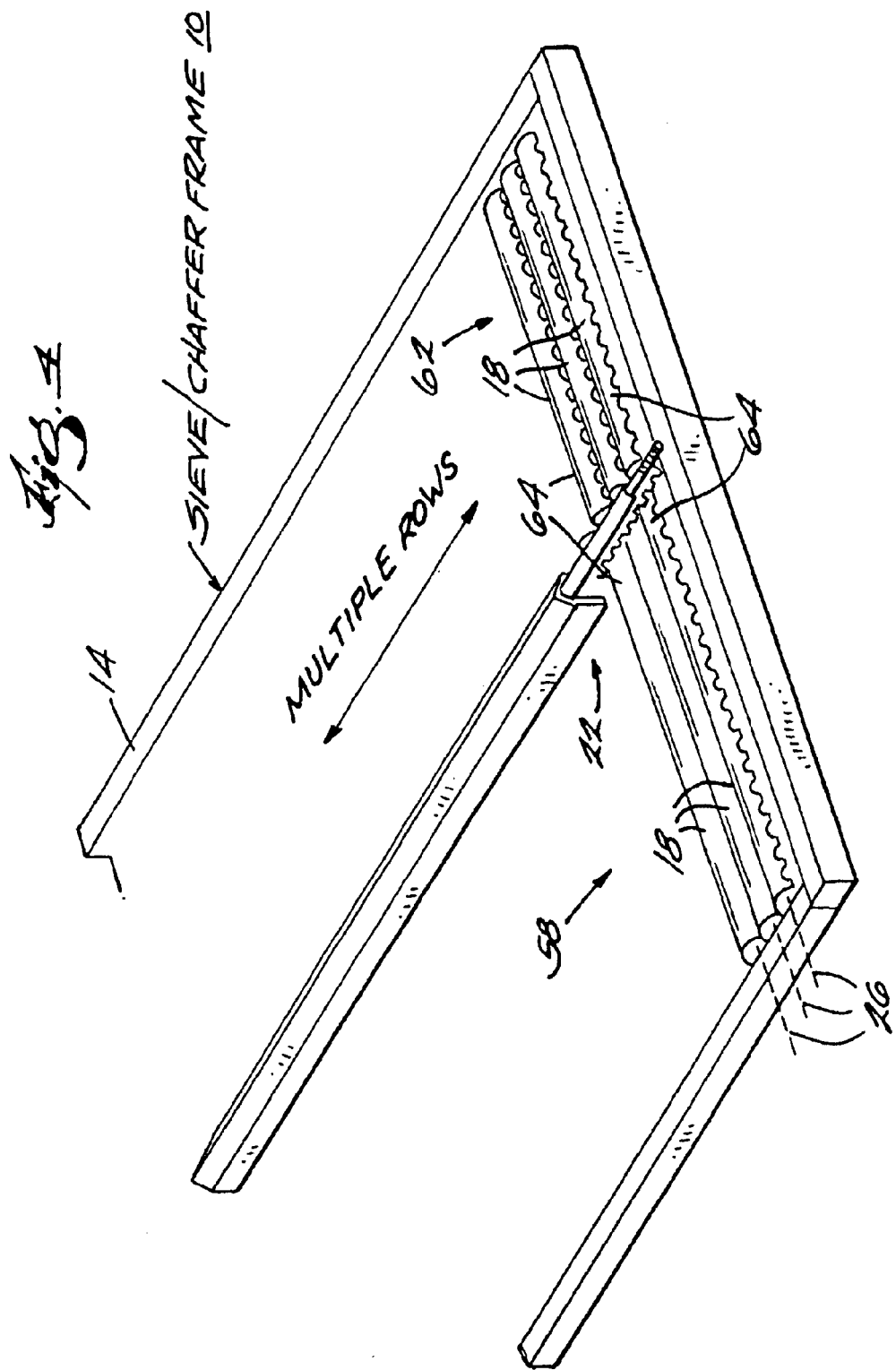

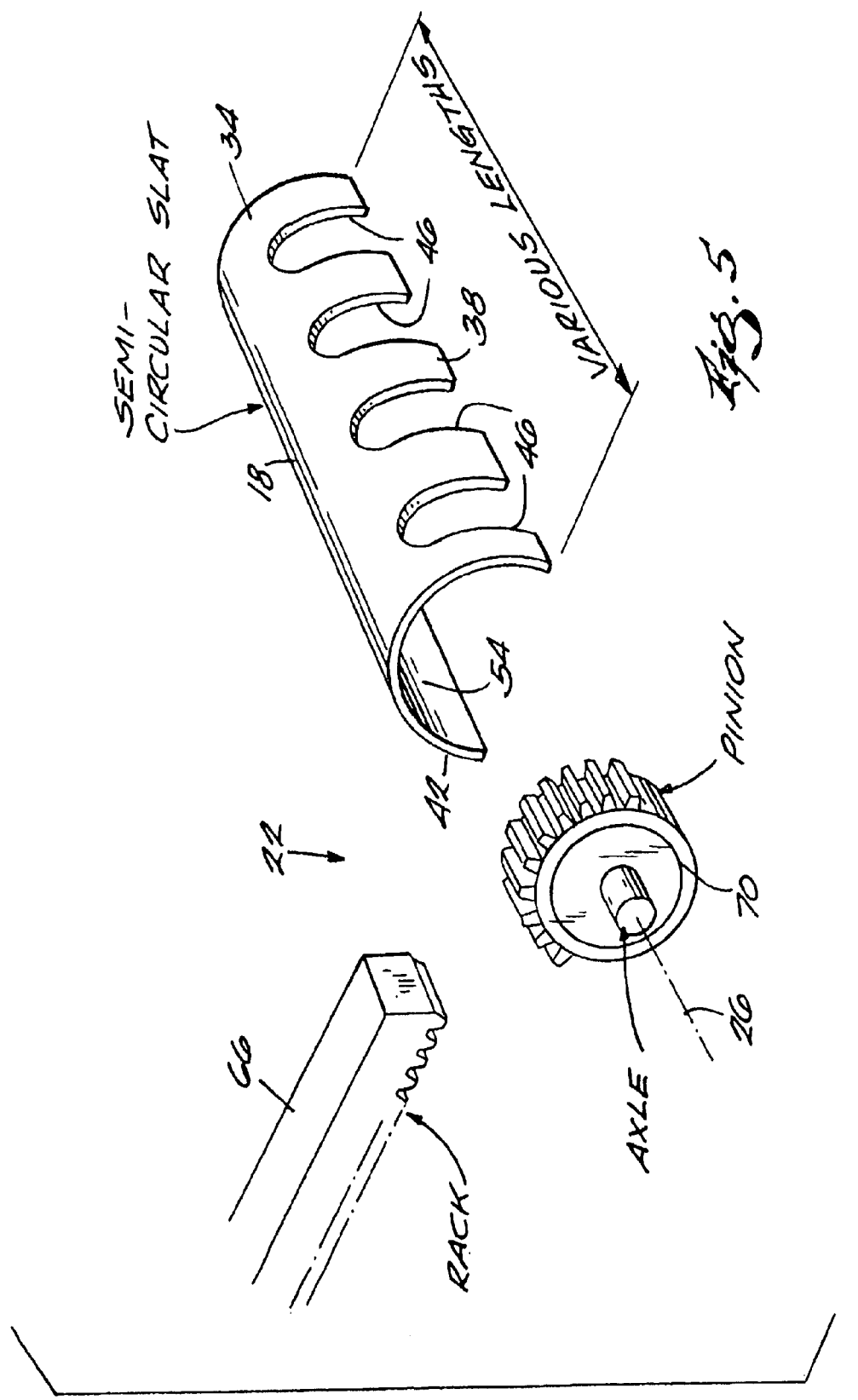

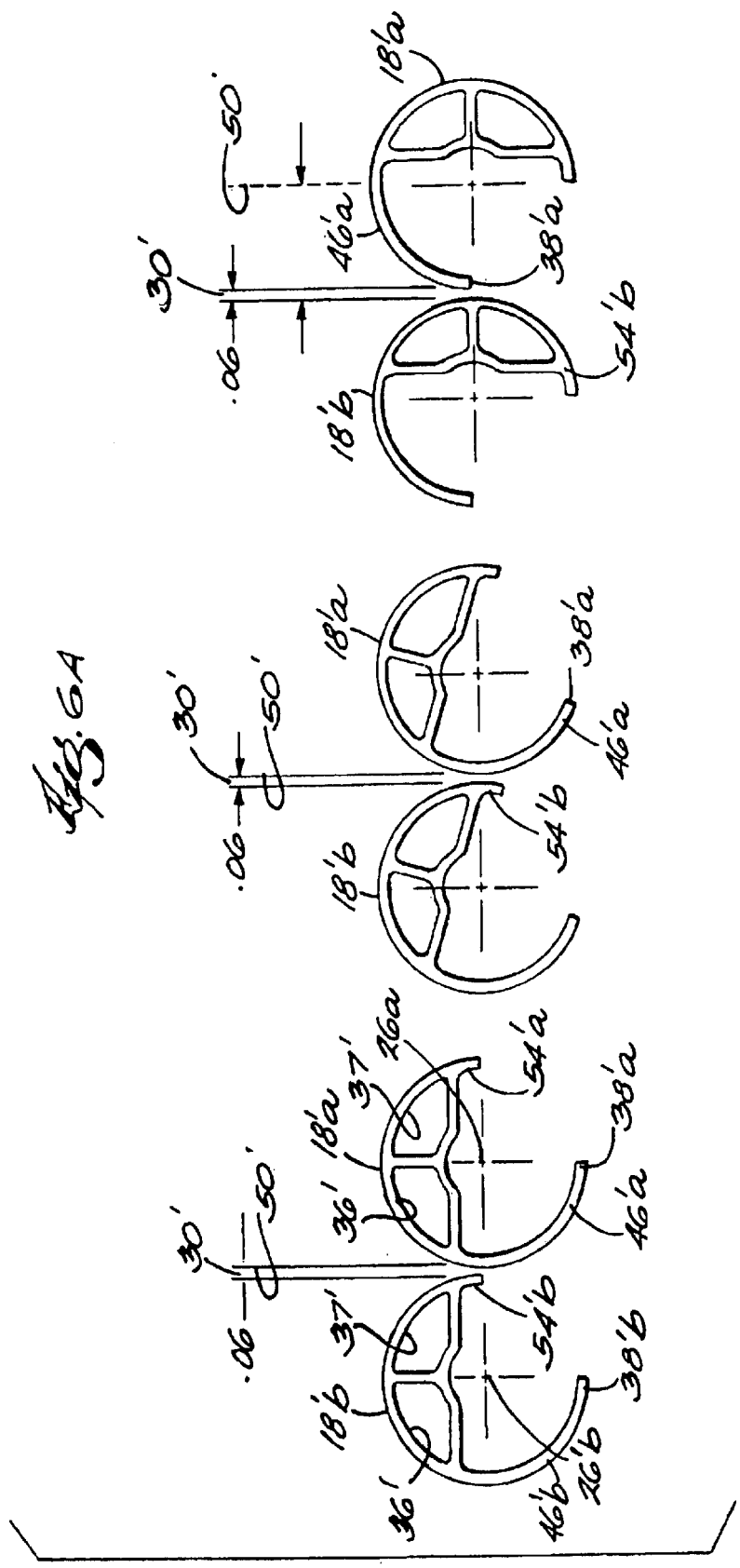

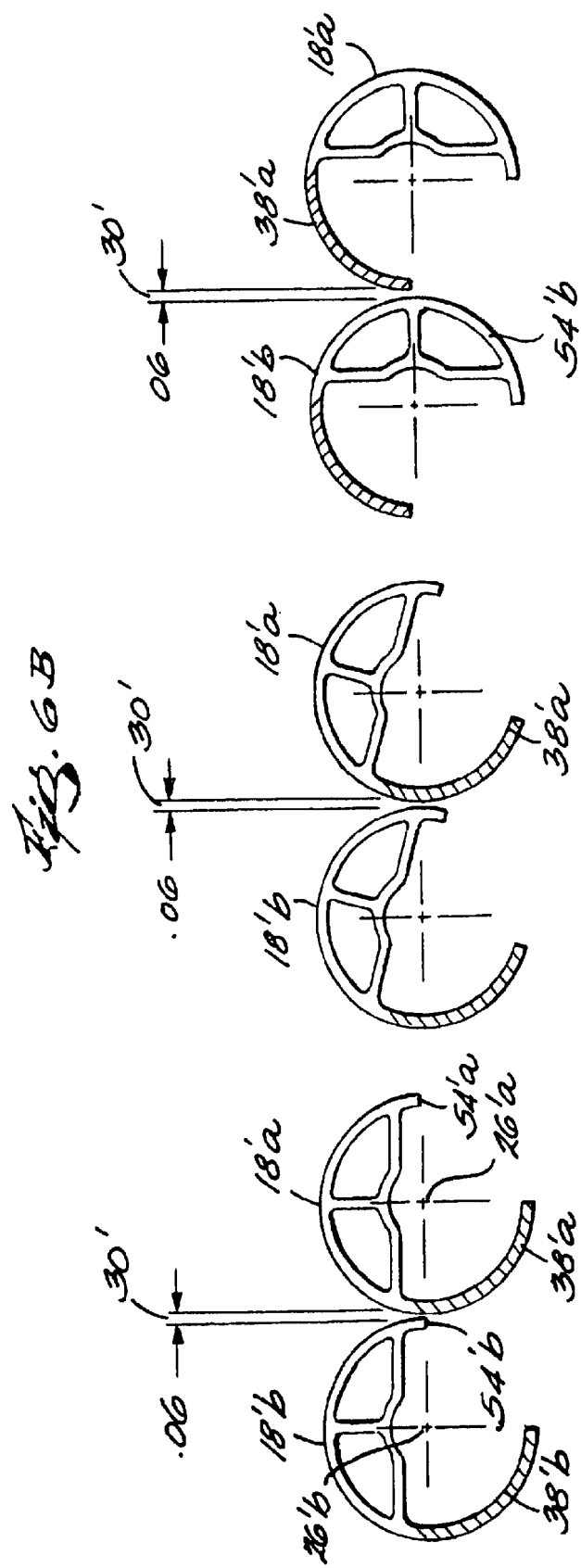

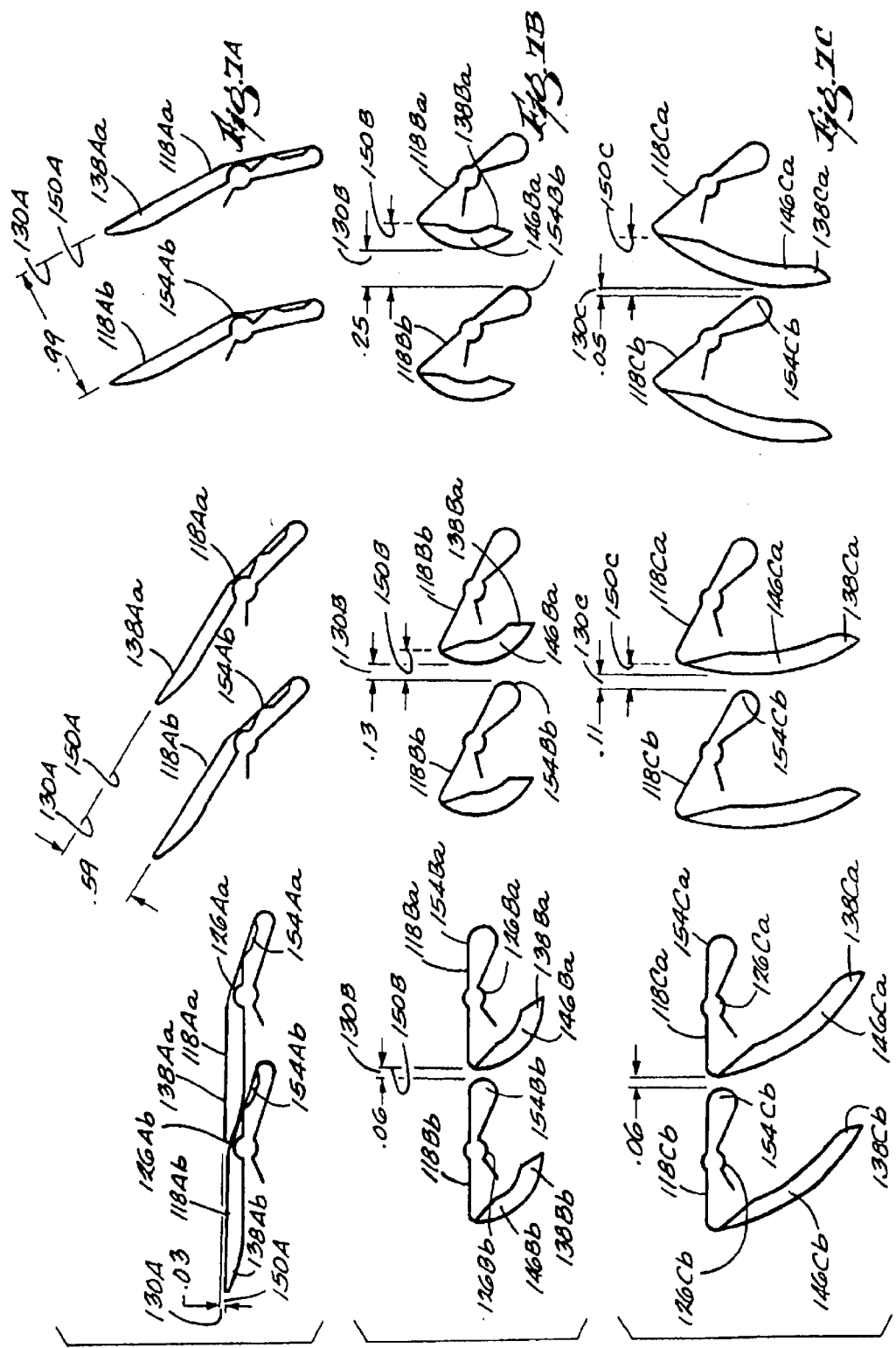

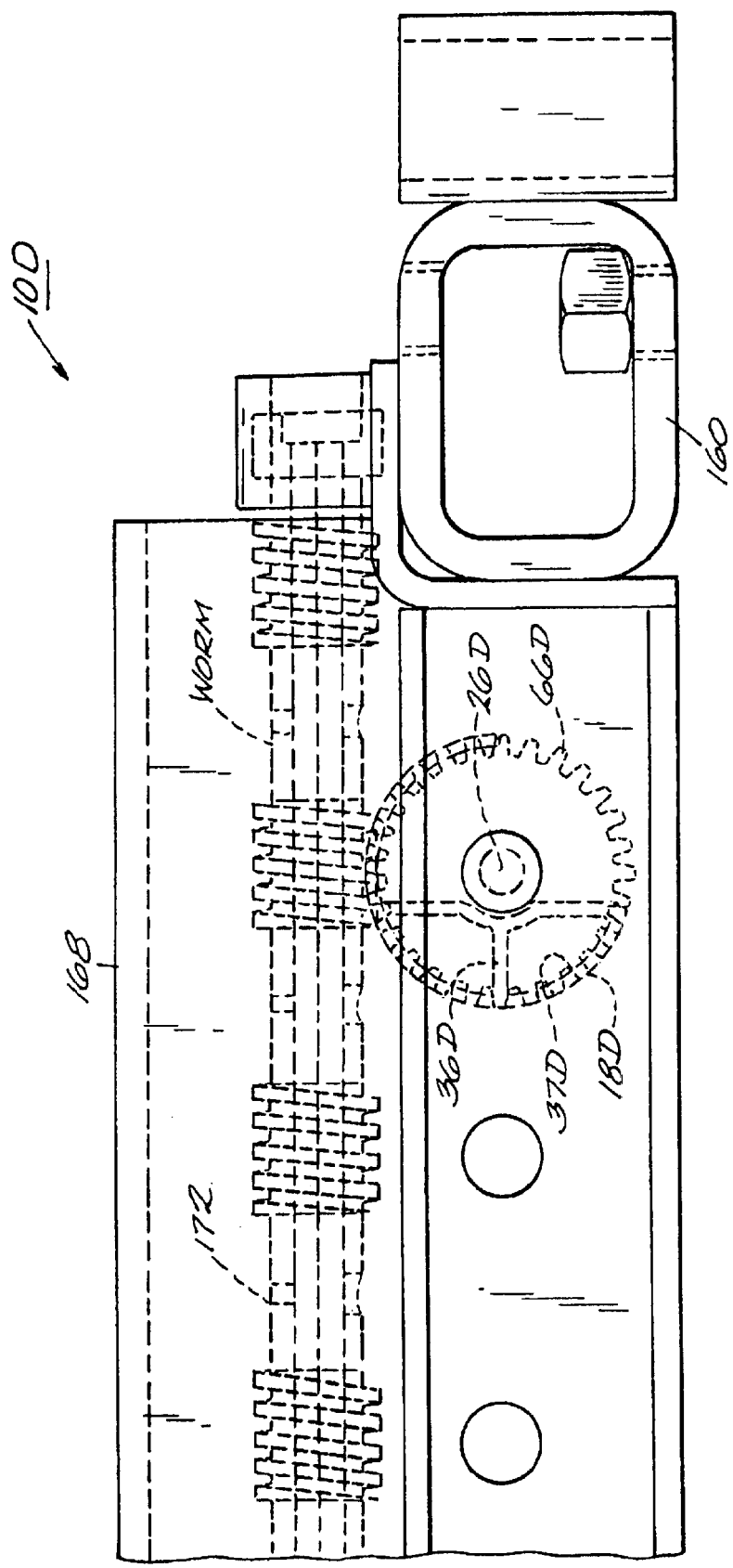

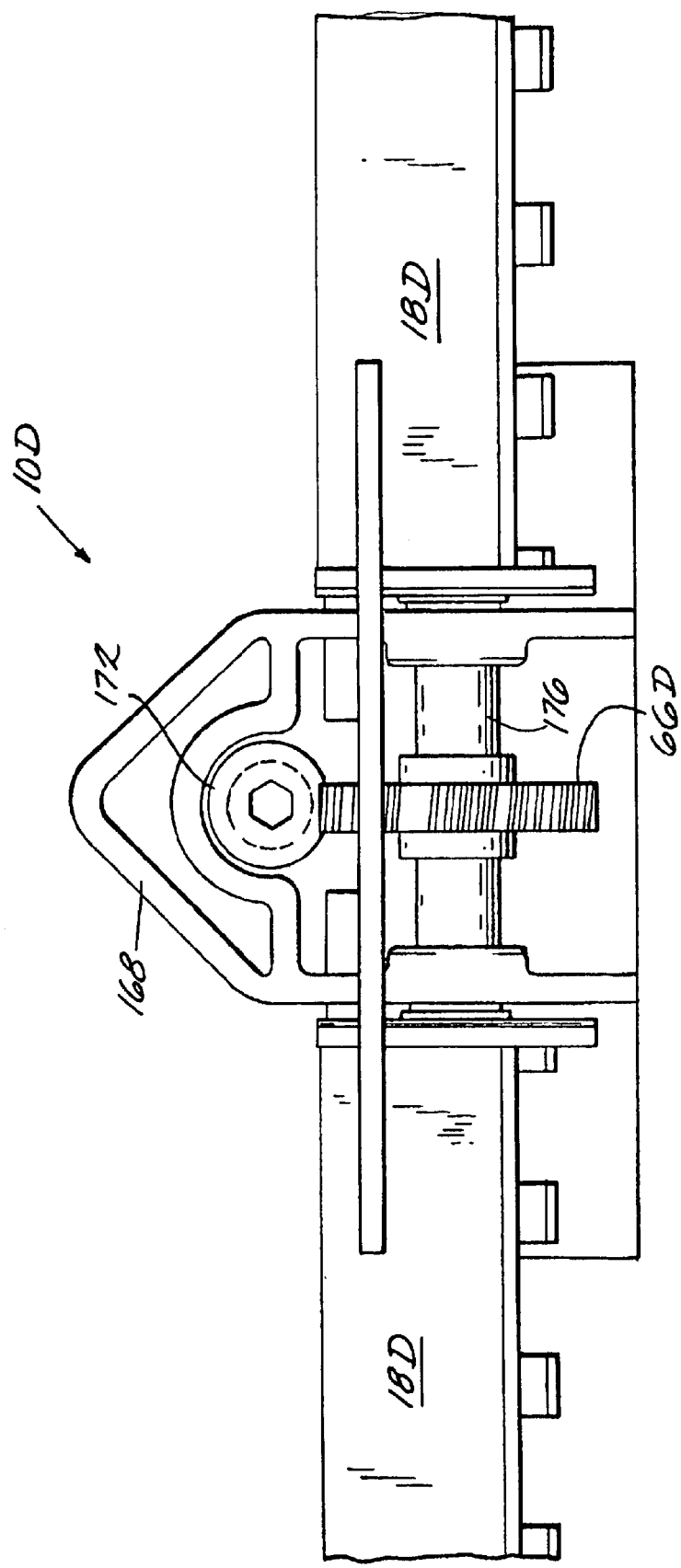

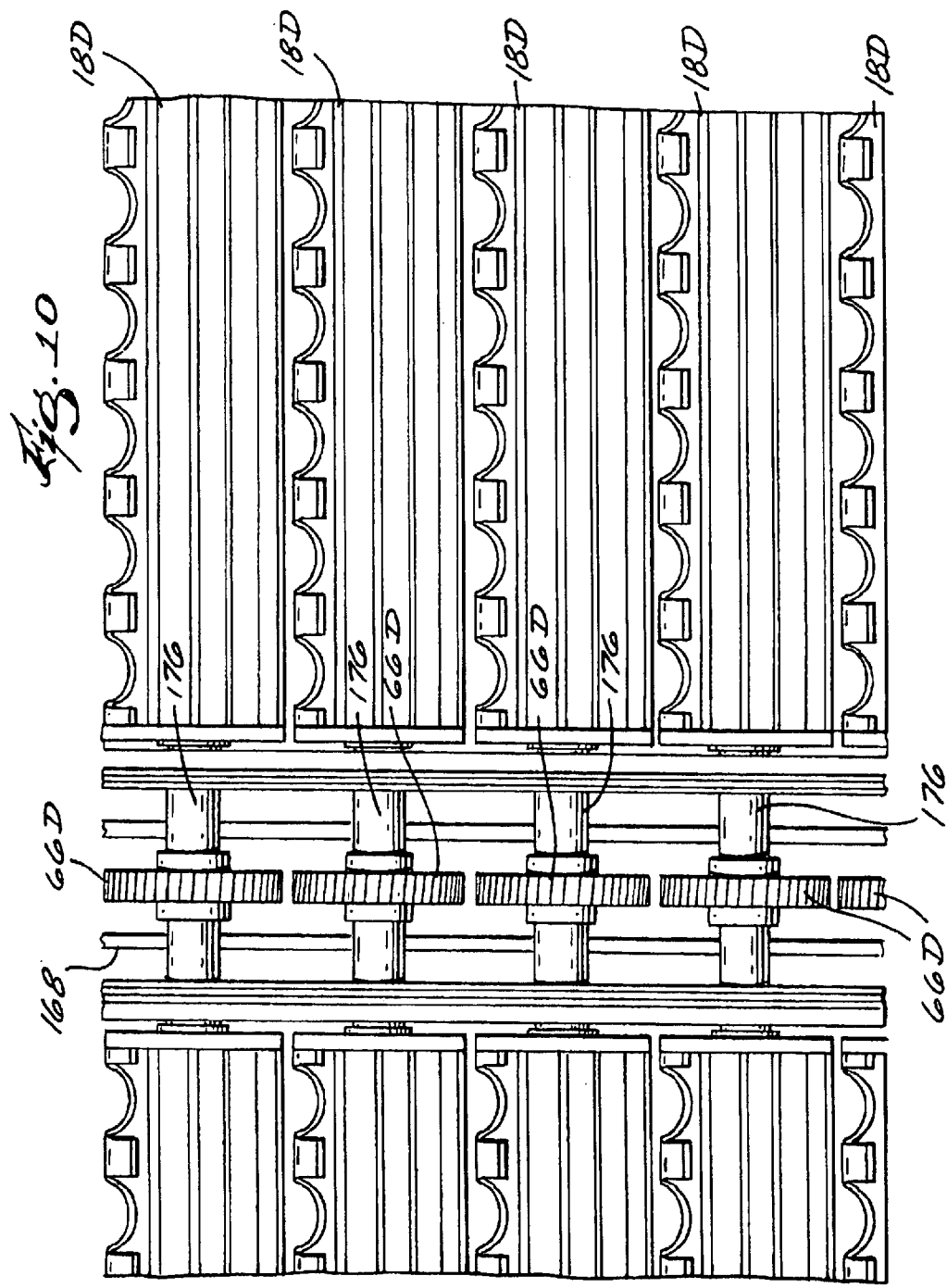

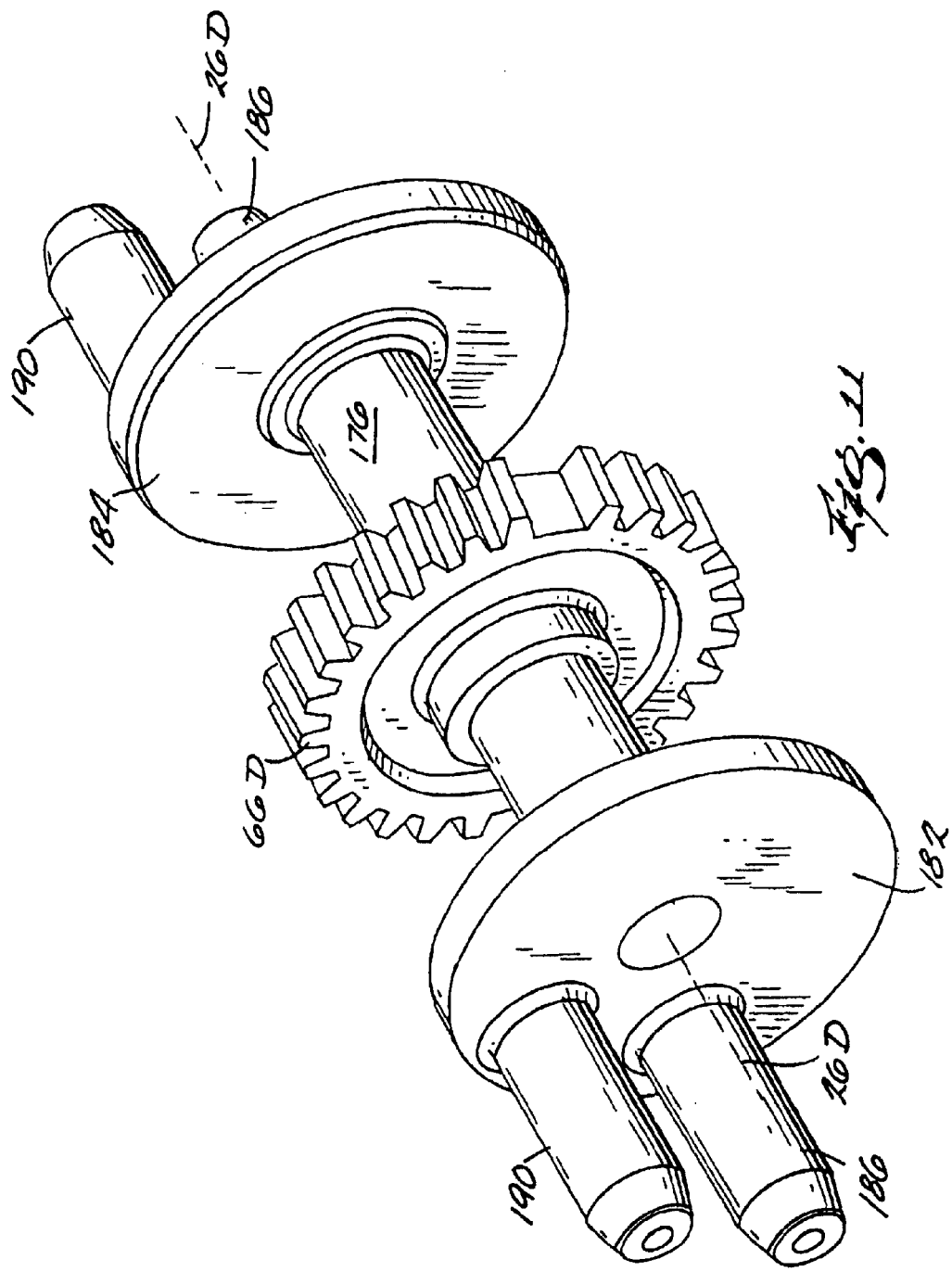

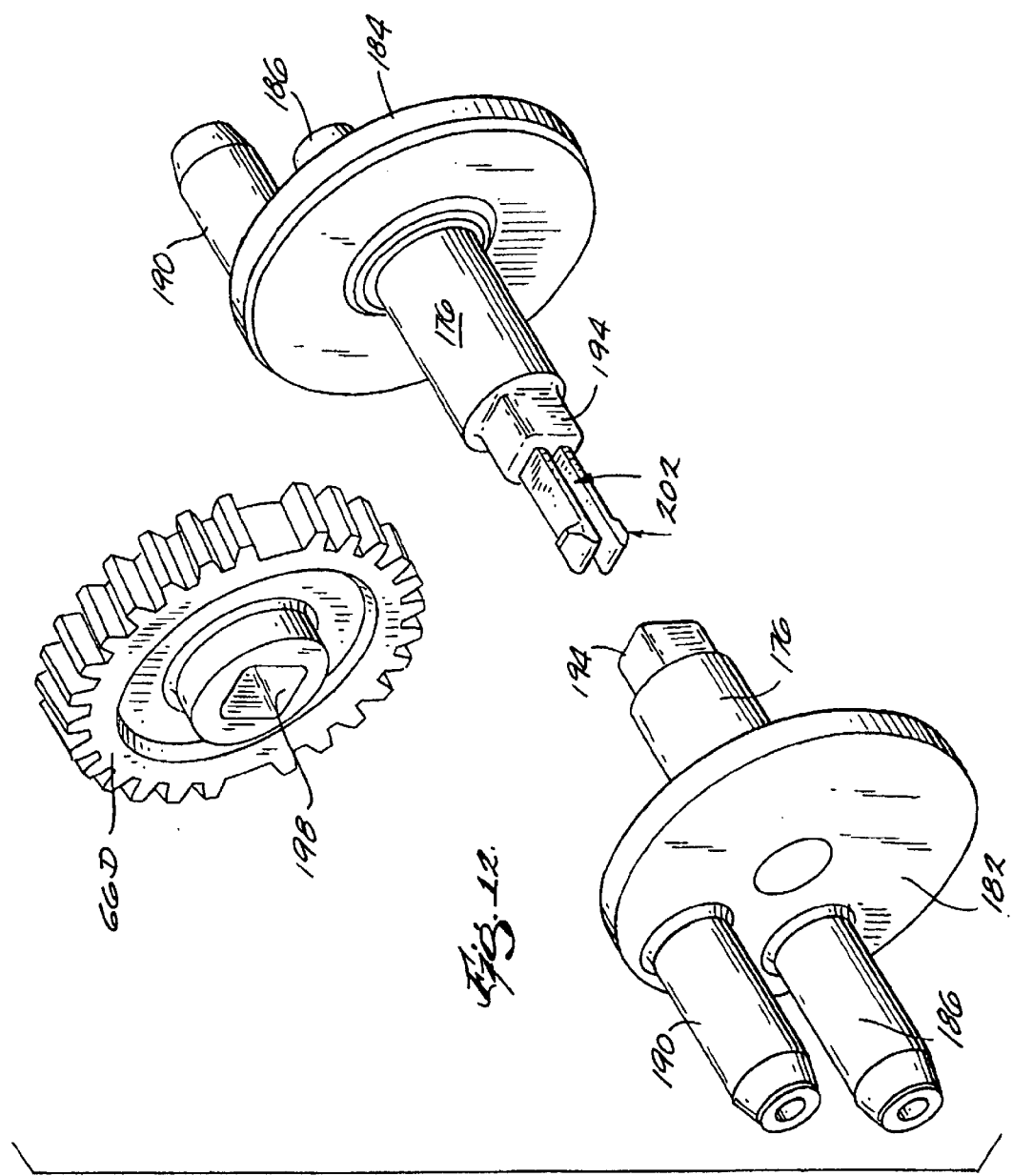

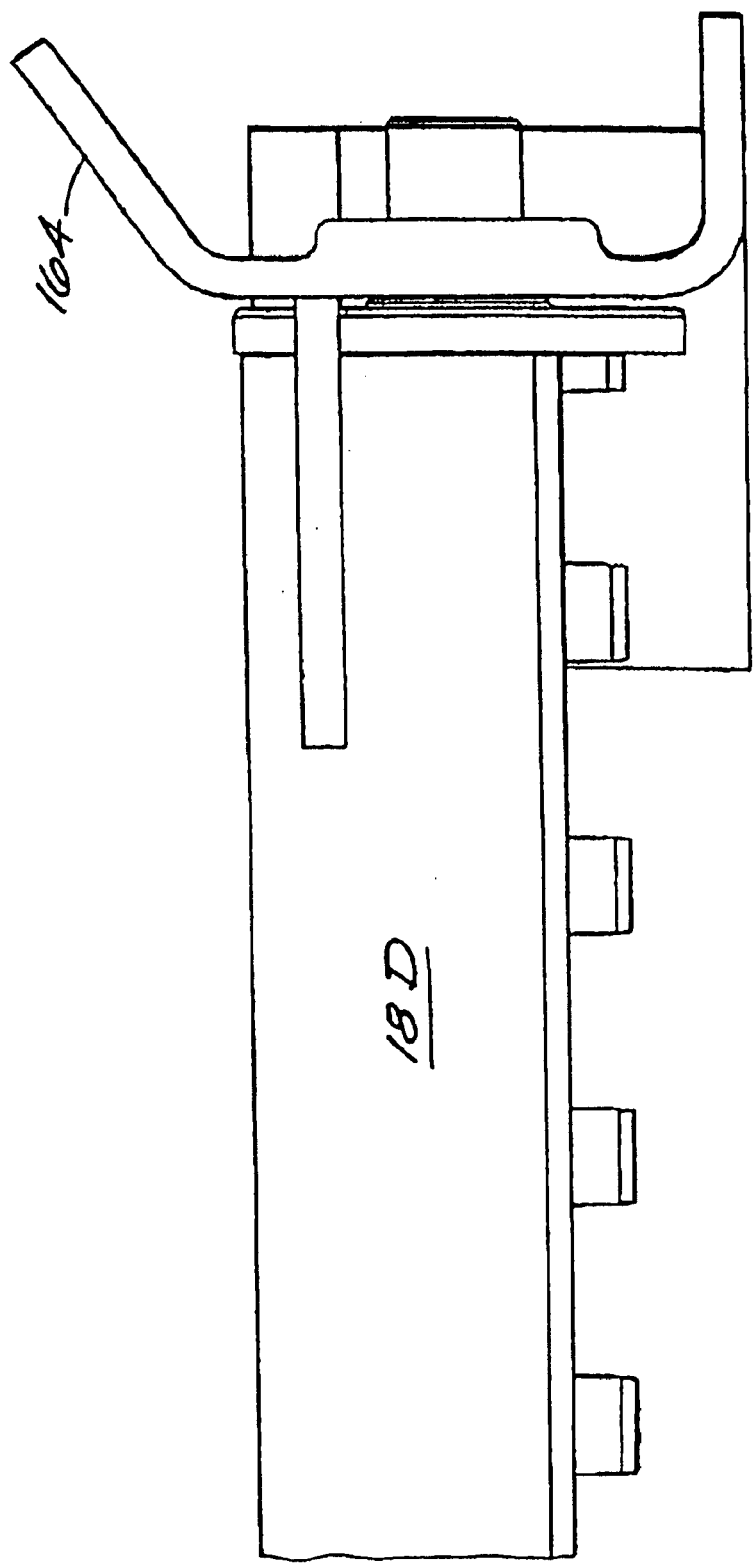

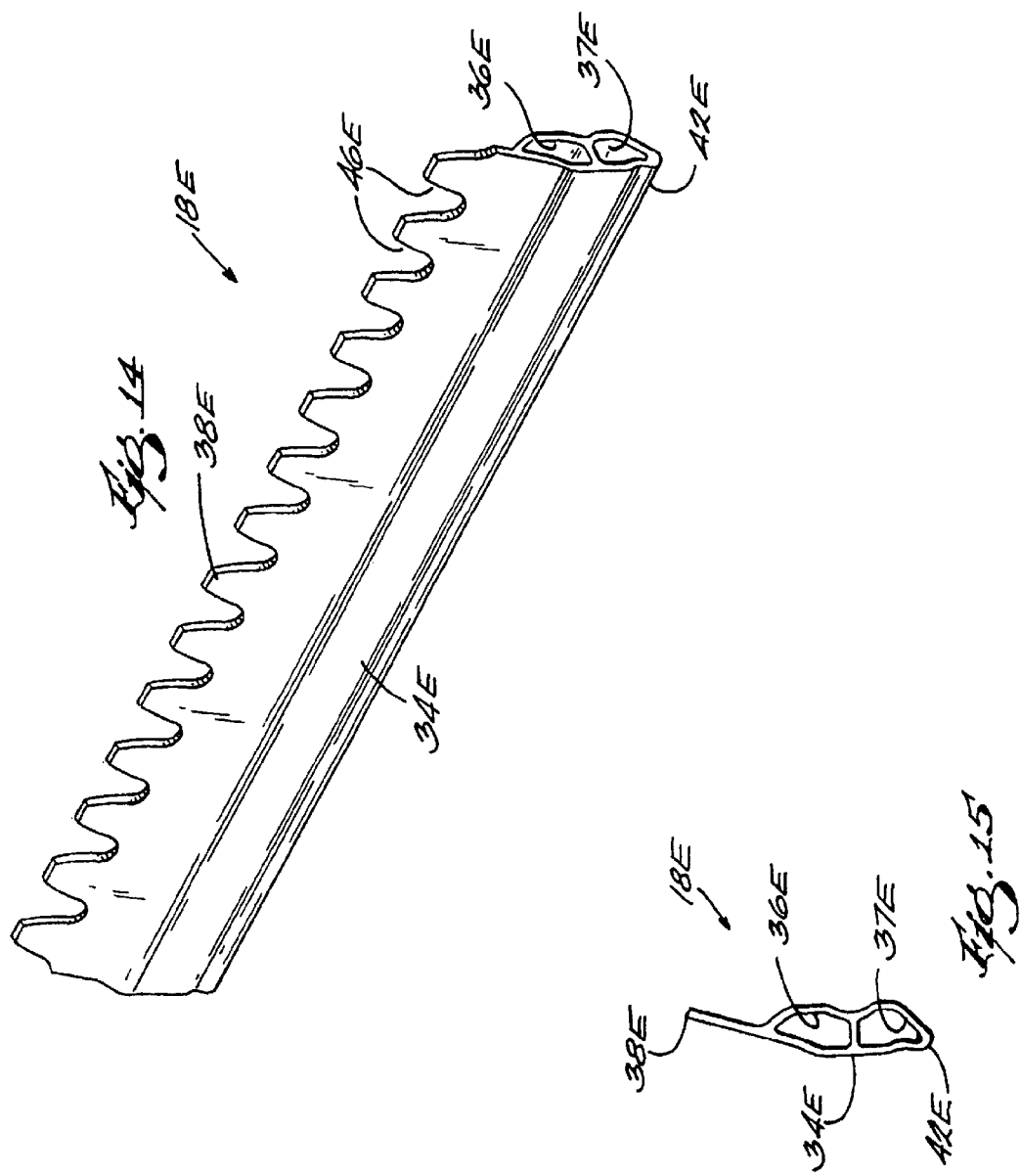

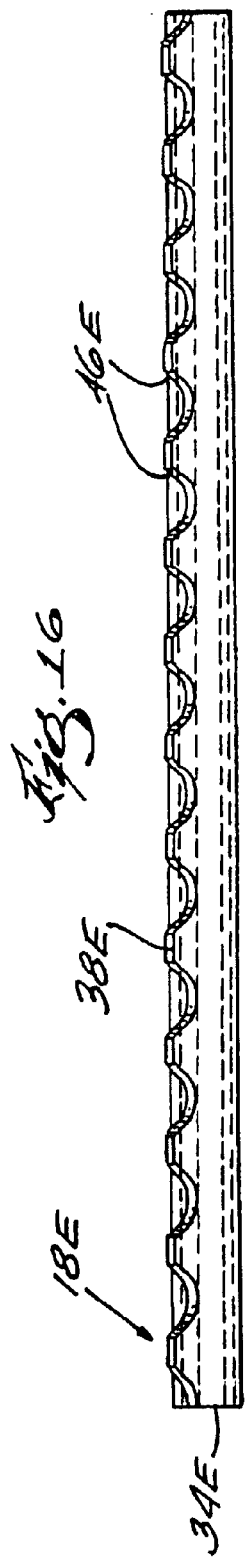
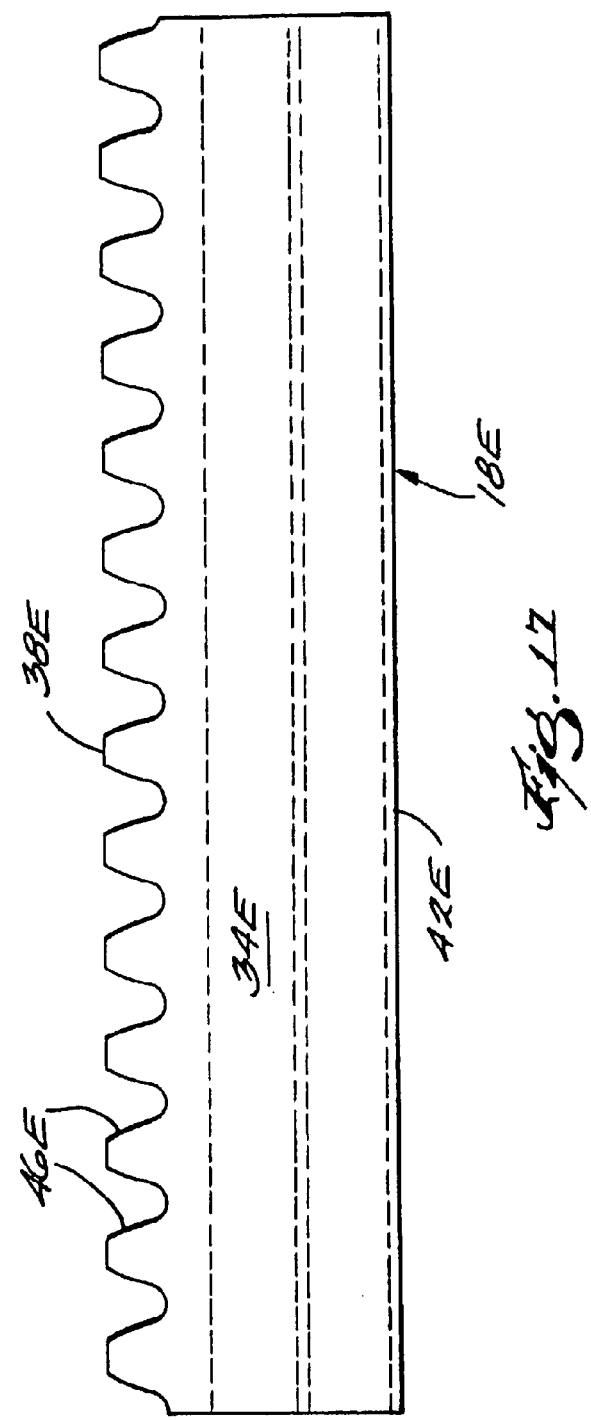

SLAT AND SIEVE ASSEMBLY

RELATED APPLICATIONS

The present application claims the benefit of prior-filed co-pending provisional patent application Ser. No. 60/412,912, filed Sep. 23, 2002, and of prior-filed co-pending provisional patent application Ser. No. 60/346,339, filed Jan. 7, 2002.

FIELD OF THE INVENTION

The present invention relates to sieves assemblies for combines and, more particularly, to slats and sieve assemblies.

BACKGROUND OF THE INVENTION

A typical sieve assembly, such as those found on combines, includes a frame supported for movement over ground and a plurality of laterally-extending slats supported by the frame. Adjacent slats define openings for material, such as grain, to pass through to be separated from unwanted material, such as stems, cobs, stalks, and straw. Typically, the slats are rotatable by a sliding bar/crank adjusting mechanism to adjust the size of the openings between adjacent slats.

SUMMARY OF THE INVENTION

Typical slats are formed from stamped sheet metal. The slats are stamped with a given transverse length and are welded to a wire. The slats and wires are positioned transversely on a frame formed of sheet metal frame members. To adjust the size of the openings between adjacent slats, each wire is rotated.

One independent problem with typical sieve assemblies is that, if unsupported, the slats tend to buckle along their length. To avoid this buckling, the slats are manufactured in shorter lengths, and supports are provided between the slats. With shorter slats, a greater number of slats and supports is required in the sieve assembly.

Another independent problem with typical sieve assemblies is that, during adjustment of the slats, adjacent slats do not maintain consistent spacing along their length as they are rotated. As the intra-slat spacing varies, greater-sized openings are created through which unwanted material, such as stems, cobs, stalks and straw, can drop.

A further independent problem with typical sieve assemblies is that, as shown in FIG. 7, because the conventional slats are not symmetrical about their rotational axis, the size of the opening between adjacent slats varies greatly based on the rotational position of the slats. As a result, adjustment of the slat spacing is very difficult and inconsistent.

Yet another independent problem with some existing sieve assemblies is that the slats do not rotate in the same quadrant as the typical sliding bar/crank adjusting mechanism. Therefore, the mechanical effort necessary to rotate the slats varies as the slats are rotated.

Another independent problem with some existing sieve assemblies is that the typical sliding bar/crank adjusting mechanism limits the extent of slat rotation and, thereby, limits the adjustability of the sieve assembly. Typical slats are rotatable about only a small arc, such as about 60°, and are not rotatable an entire 360° about the axis.

A further independent problem with typical sieve assemblies is that the frames are formed of sheet steel which provides only relatively simple frame members having limited structural features.

The present invention provides a sieve assembly and a slat for the sieve assembly which substantially alleviates one or more of these and other independent problems with the above-described sieve apparatus.

More particularly, in some aspects and in some constructions, the present invention provides a slat for a sieve assembly, the slat comprising a blade having a semi-circular cross-section and extending at least 180° about an axis. The blade has spaced apart first and second edges extending parallel to the axis. Evenly spaced finger-like indentations are defined on the first edge. The blade is supportable by a frame and couplable to a rotational drive mechanism for rotation about the axis.

Also, in some aspects and in some constructions, the present invention provides a sieve assembly comprising a frame and a slat supported by the frame. The slat has a semi-circular cross-section and extends at least 180° about an axis. The slat has spaced apart first and second edges extending parallel to the axis, and evenly spaced finger-like indentations are defined on the first edge. The slat is couplable to a rotational drive mechanism for rotation about the axis.

In addition, in some aspects and in some constructions, the present invention provides a sieve assembly comprising a frame, first and second slats supported by the frame in parallel, and a drive mechanism for rotating the slats. Each slat has spaced apart first and second portions extending parallel to an axis. The first portion of one slat is positioned adjacent the second portion of the other slat to define an opening therebetween. The drive mechanism includes a pinion connected to the end of each slat, and a rack supported by the frame and engaging the pinions. The rack is axially slidable relative to the frame, and axial movement of the rack causes rotation of the slats about their axes to vary the size of the opening between the slats.

Further, in some aspects and in some constructions, the present invention provides a sieve assembly comprising a frame, first and second slats supported by the frame in parallel, and a drive mechanism for rotating the slats. Each slat has spaced apart first and second edges extending parallel to an axis. The first edge of one slat is positioned adjacent the second edge of the other slat to define an opening therebetween. Each slat has a semi-circular cross-section and extends at least 180° about an axis, and evenly spaced finger-like indentations defined on the first edge of each slat. The drive mechanism includes a pinion connected to the end of each slat, and a rack supported by the frame and engaging the pinions. The rack is axially slidable relative to the frame, and axial movement of the rack causes rotation of the slats about their axes to vary the size of the opening between the slats.

Also, in some aspects and in some constructions, the present invention provides a slat for a sieve assembly, the slat comprising a blade having a cross-section and a length. The blade is extruded to provide the cross-section. The blade is supportable by a frame and couplable to a rotational drive mechanism for rotation about an axis.

In addition, in some aspects and in some constructions, the present invention provides a sieve assembly, the sieve assembly comprising a frame, a rotational drive mechanism supported by the frame, the drive mechanism including a rotational member rotatable about an axis, a first support member and a second support member, the first support member and the second support member extending from the rotational member along the axis, and a blade having a cross-section, the cross-section including a first adjustment opening and a second adjustment opening, the first adjustment opening and the second adjustment opening extending along the axis. The blade is supportable by the frame and couplable to the drive mechanism for rotation about the axis. The first support member and the second support member are received in the first adjustment opening and the second adjustment opening, respectively, to couple the slat to the drive mechanism. Rotation of the rotational member about the axis causes rotation of the slat about the axis.

Further, in some aspects and in some constructions, the present invention provides a sieve assembly, the sieve assembly comprising a frame, a rotational drive mechanism supported by the frame, the drive mechanism including a rotational member rotatable about an axis, a first support member and a second support member, the first support member and the second support member extending from the rotational member along the axis, and a blade having a cross-section, the cross-section including a first adjustment opening and a second adjustment opening, the first adjustment opening and the second adjustment opening extending along the axis. The blade is extruded to provide the cross-section. The blade is supportable by the frame and couplable to the drive mechanism for rotation about the axis. The first support member and the second support member are received in the first adjustment opening and the second adjustment opening, respectively, to couple the slat to the drive mechanism. Rotation of the rotational member about the axis causes rotation of the slat about the axis.

Also, in some aspects and in some constructions, the present invention provides a sieve assembly comprising a frame, first and second slats supported by the frame in parallel, and a rotational drive mechanism for rotating the slats. Each slat has spaced apart first and second edges extending parallel to an axis. The first edge of one slat is positioned adjacent the second edge of the other slat to define an opening therebetween. The drive mechanism includes a pinion connected to the end of each slat, and a worm supported by the frame and engaging the pinions. The worm is rotatable relative to the frame, and rotation of the worm causes rotation of the slats about their axes to vary the size of the opening between the slats.

In addition, in some aspects and in some constructions, the present invention provides a sieve assembly, the sieve assembly comprising a frame, the frame including frame members connected to form the frame, a rotational drive mechanism supported by the frame, and a blade. The blade is supportable by the frame and couplable to the drive mechanism for rotation about an axis. Each frame member has a cross-section. At least one of the frame members is extruded to provide the corresponding cross-section.

One independent advantage of the present invention is that, because, in some aspects of the invention, the slats have a circular cross-section, the slats are self-supporting along their length and may be unsupported for greater lengths of, for example, up to 30 inches or more. Because the slats may be unsupported for greater lengths, fewer slats are needed, and supports between slats may be eliminated.

Another independent advantage of the present invention is that, because, in some aspects of the invention, the slats do not tend to buckle, adjacent slats maintain consistent spacing along their length as they are rotated. The intra-slat spacing does not vary, and unwanted material, such as stems, cobs, stalks and straw, is prevented from dropping through the openings.

A further independent advantage of the present invention is that, because, in some aspects of the invention, the slats are symmetrical about their rotational axis, the change of the size of the opening is consistent as the slats are rotated. More accurate rotary positioning of the slat and more precise control of the openings is provided, making it ideal for systems employing closed loop control of the slat opening.

Yet another independent advantage of the present invention is that, in some aspects of the invention, the slats rotate in the same quadrant as the adjusting mechanism. Therefore, mechanical effort is consistent as the slats rotate about an axis.

Another independent advantage of the present invention is that, in some aspects of the invention, the adjusting mechanism does not limit the extent of slat rotation. The adjustability of the sieve assembly is also not limited by the adjusting mechanism. Theoretically, in some aspects of the invention, the slats are rotatable an entire 360°, or more, about the axis.

A further independent advantage of the present invention is that a sieve assembly is provided which does not create unwanted openings between slats through which material, such as straw, can drop.

Yet another independent advantage of the present invention is that, in some aspects, the slats are extruded to provide the necessary shape and cross-section. The extruded slats can be formed in or cut to the desired length for a sieve assembly.

Another independent advantage of the present invention is that, in some aspects, the frame members are extruded to provide the necessary shape, cross-section and structural features.

Other independent features and independent advantages of the present invention will become apparent to those skilled in the art upon review of the following detailed description and drawings.

BRIEF DESCRIPTION OF THE DRAWINGS

FIG. 2 is a side view of the sieve assembly shown in FIG. 1.

FIG. 3 is a front view of the sieve assembly shown in FIG. 1.

FIG. 4 is a perspective view of the sieve assembly shown in FIG. 1 and illustrating greater detail of slats and an adjusting mechanism embodying aspects of the invention.

FIG. 5 is an exploded view of a slat and the adjusting mechanism shown in FIG. 4.

FIG. 6A is a side view of an alternate construction of a slat embodying aspects of the invention and illustrating adjustment of adjacent slats.

FIG. 6B is a partial cross-sectional side view of the slat shown in FIG. 6A.

FIGS. 7A, 7B and 7C are side views of prior art slats and illustrating adjustment of adjacent slats.

FIG. 8 is a partial cross-sectional side view of a portion of an alternate construction a sieve assembly embodying aspects of the invention and illustrating an alternate construction of the adjusting mechanism.

FIG. 9 is an end view of a portion of the sieve assembly shown in FIG. 8.

FIG. 10 is a bottom view of a portion of the sieve assembly shown in FIG. 8.

FIG. 11 is a perspective view of a portion of the adjusting mechanism shown in FIG. 8.

FIG. 12 is an exploded perspective view of the portion of the adjusting mechanism shown in FIG. 11.

FIG. 13 is an end view of a portion of the sieve assembly shown in FIG. 8 and illustrating the side frame channel.

FIG. 14 is a perspective view of another alternate construction of a slat embodying aspects of the invention.

FIG. 15 is a side view of the slat shown in FIG. 14.

FIG. 16 is a front view of the slat shown in FIG. 14.

FIG. 17 is a top view of the slat shown in FIG. 14.

Figure 1:
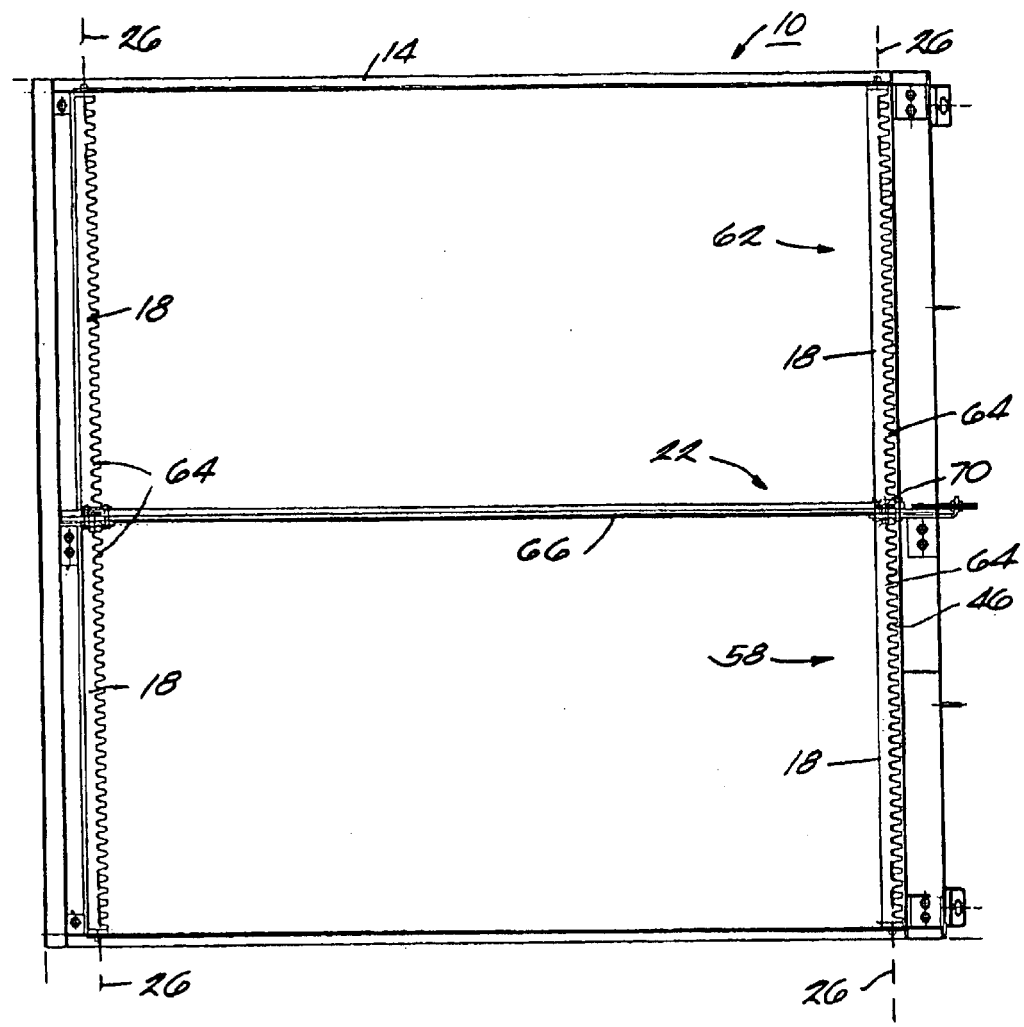
FIG. 1 is a top view of a sieve assembly embodying aspects of the invention.

Before at least one embodiment of the invention is explained in detail, it is to be understood that the invention is not limited in its application to the details of the construction and the arrangements of the components set forth in the following description or illustrated in the drawings. The invention is capable of other embodiments and of being practiced or carried out in various ways. Also, it is understood that the phraseology and terminology used herein is for the purpose of description and should not be regarded as limiting.

DETAILED DESCRIPTION

A sieve assembly 10 for use in a combine (not shown) and embodying aspects of the invention is illustrated in FIGS. 1–2 and 4–5. The sieve assembly 10 includes a frame 14 supported for movement over ground in a direction. A plurality of laterally-extending slats 18 are supported by the frame 14 in parallel across the width of frame 14. An adjusting or drive mechanism 22 is supported on the frame 14 and is operable to position the slats 18.

As shown in more detail in FIGS. 4–6, each slat 18 is supported for pivoting movement and/or rotation about an axis 26, and adjacent slats (for example, slats 18a and 18b) define a space 30 therebetween. Each slat 18 is identical and is provided by a blade 34 having, in the illustrated construction and in some aspects, a generally semi-circular cross-section (i.e., the blade 34 is substantially symmetrical and has a constant radius about the axis 26) and extends at least 180° about the axis 26. The cross-section of the slat 18 provides rigidity so that the slat 18 may have a greater length (for example, up to 30 inches or more) without requiring a support system.

Each blade 34 has spaced apart first and second edges 38 and 42, and the slats 18 are arranged so that the first edge of one slat (i.e., the first edge 38a of the slat 18a) is adjacent to the second edge of the adjacent slat (i.e., the second edge 42b of the slat 18b) to define the space 30 therebetween. Finger-like indentations 46 are defined on the first edge 38 of each slat 18 to provide adjustment of the size of an opening 50 between adjacent slats 18. The opening 50 includes the space 30 between the slats 18 and the indentations 46. The second edge 42 of the slat 18 provides a curved baffle portion 54.

FIGS. 6A and 6B illustrate an alternate construction of a slat 18' and illustrates adjustment of the slats 18'. As shown in FIGS. 6A and 6B, the slat 18' extends about 270° about the axis 26'. In the illustrated construction and in some aspects, axial adjustment cavities or openings 36' and 37' are provided in the blade 34', and, as described below in more detail, the drive mechanism 22 is connectable to the adjustment cavities 36' and 37' to pivotably and/or rotatably move the slat 18'. The cross-section of the slat 18' also provides rigidity so that the slat 18' may have a greater length (for example, up to 30 inches or more) without requiring a support system.

In some aspects and in some constructions (not shown), the blade 34' provides a single axial adjustment cavity 36' or three or more adjustment cavities. In some constructions, the driving engagement is provided by the connection between the drive mechanism 22 and the adjustment opening 36' being offset from and/or non-concentric with the axis 26'. In some constructions, the driving engagement is provided by the connection between the drive mechanism 22 and the adjustment opening 36' having a driving shape (i.e., a shape which provides a driving connection between the drive mechanism 22 and the adjustment opening 36', such as a non-circular cross-sectional shape). In some constructions, the drive mechanism 22 may positively engage the adjustment opening 36' (for example, by being non-concentric and/or non-circular) and/or may frictionally engage the adjustment opening 36' (even if concentric with the axis 26' and circular).

As the slats 18' are pivoted (as illustrated by the change in position of the slats 18'), the size of the space 30' between adjacent slats 18' remains substantially constant because the slat 18' has a constant radius about the axis 26'. The curved baffle portion 54' on one slat (i.e., the slat 18b') cooperates with the first edge 38' on the adjacent slat (i.e., the slat 18a') to maintain the constant opening 30'.

In some aspects, the slat 18 or 18' is extruded to provide a desired cross-section, such as the cross-section shown in FIG. 5 and in FIG. 6, respectively. Preferably, the extruded slat 18 or 18' is extruded from material, such as, for example, ABS plastic. In other constructions, the extruded slat 18 or 18' may be extruded from another suitable extrudable material. The extruded slat 18 or 18' may be formed in or cut to the desired length for the sieve assembly 10.

In the illustrated construction (see FIGS. 1 and 4), the slats 18 are arranged in two series or panels 58 and 62 of slats 18, and the slats 18 in the first panel 58 are preferably aligned along their axis 26 with the slats 18 in the second panel 62 to form a linked pair 64 of slats 18. The cross-section of the slat 18 also eliminates the need for individual slats for each panel 58 and 62. The drive mechanism 22 is preferably positioned between the panels 58 and 62 of slats 18 to rotatably drive each pair 64 of slats, 18, thereby simultaneously rotatably driving the slats 18 in each panel 58 and 62.

As shown in FIGS. 4–5, in some constructions and in some aspects, the drive mechanism 22 includes a rack 66 and a pinion 70 connected to each pair 64 of slats 18 (at the central end of each slat 18) and cooperating with the rack 66. The rack 66 extends generally perpendicularly to the slats 18 and is supported by the frame 14 for movement generally transverse to the slats 18.

In operation, axial sliding movement of the rack 66 causes rotation of each pinion 70, resulting in rotation of the corresponding pair 64 of slats 18. As shown in FIG. 6, as the slats 18 rotate about axis 26, the size of the space 30 between adjacent slats 18a and 18b remains substantially constant, preventing unwanted gaps. The size of the opening 50 changes consistently as more or less of the indentations 46 is presented.

In some aspects, the drive mechanism 22 requires consistent mechanical effort to adjust the position of the slats 18 and, in some constructions, provides unlimited rotation (up to and beyond 360° of rotation) of the slats 18 and, thereby, unlimited adjustability of the sieve assembly 10. The drive mechanism 22 also provides incremental adjustment of the openings 50 that maintains the same ratio throughout the operating range. The linear movement of the rack 66 correlates to the rotational opening of the slats 18.

FIGS. 7A, 7B and 7C illustrates the adjustment of conventional slats 118A, 118B and 118C, respectively. As shown in FIGS. 7A, 7B and 7C, as the slats 118A, 118B and 118C rotate, the size of the opening 130A, 130B and 130C, respectively, changes. In addition, the amount of indentation 146A, 146B and 146C presented at each rotated position of the slat 118A, 118B and 118C, respectively, changes. Therefore, the size of the opening 150A, 150B and 150C does not change consistently with rotation of the conventional slats 118A, 118B and 118C, respectively.

FIGS. 8–13 illustrate an alternative construction of a sieve assembly 10D embodying aspects of the invention. Common elements are identified by the same reference number "D".

The sieve assembly 10D includes a frame 14D formed of end frame members 160 (one shown in FIG. 8) and side frame members 164 (one shown in FIG. 13). The frame 14D also includes (see FIGS. 8–10) a center divider member 168. In some constructions, preferably, at least the side frame members 164 and the center divider member 168 are extruded from material, such as, for example, aluminum, to provide the illustrated cross-section and structural features.

In other constructions, the end frame members 160 may be also extruded. Also, in other constructions, the extruded members (such as the side frame members 164 and the center divider member 168) may be extruded of another suitable extrudable material. The extruded members provide the necessary structural strength for the frame 14D while reducing the weight of the frame 14D. In yet other constructions (not shown), the components of the frame 14D may not be extruded but may be formed in a different manner.

The sieve assembly 10D also includes an adjusting or drive mechanism 22D to position the slats 18D. In the illustrated construction and in some aspects, the drive assembly 22D includes a pinion 66D connected to each pair of slats 18D (at the central end of each slat 18D) and a cooperating worm 172. The worm 172 is rotatably supported by the center divider member 168, and the center divider member 168 and the pinions 66D cooperate to provide bearing support for the worm 172.

Each pinion 66D is supported on an axle 176 and is drivingly connected to the slats 18D by connectors 182 and 184. Each connector 182 and 184 includes support members 186 and 190 extending along the axis 26D. To connect the pinion 66D to each slat 18D, the support members 186 and 190 are received in the adjustment openings 36D and 37D so that the slat 18D is rotatable with the pinion 66D.

In some aspects and in some constructions (not shown), each connector 182 and 184 may include a single support member 186 received by a single axial adjustment opening 36D to connect the pinion 66D to each slat 18D. In such constructions, the support member 186 is in driving engagement with the adjustment opening 36D to rotate the slat 18D.

In some constructions, the driving engagement is provided by support member 186 and the adjustment opening 36D being offset from and/or non-concentric with the axis 26D. In some constructions, the driving engagement is provided by the support member 186 and the adjustment opening 36D having a driving shape (i.e., a shape which provides a driving connection between the support member 186 and the adjustment opening 36D, such as a non-circular cross-sectional shape). In some constructions, the support member 186 may positively engage the adjustment opening 36D (for example, by being non-concentric and/or non-circular) and/or may frictionally engage the adjustment opening 36D (even if concentric with the axis 26D and circular).

As shown in FIG. 12, the connectors 182 and 184 provide the axle 176 for the pinion 66D and include a square driving key portion 194 which is received in a keyway 198 in the pinion 66D to drivingly connect the connectors 182 and 184 and the pinion 66D. The connectors 182 and 184 are connected to each other by connecting structure, such as, for example, flexible locking members 202 and a locking recess (not shown).

In operation, rotation of the worm 172 causes pivoting movement of each pinion 66D. Rotation of each pinion 66D causes rotation of the axle 176, thereby causing rotation of the connectors 182 and 184. Rotation of the connectors 182 and 184 results in pivoting movement of a corresponding pair of slats 18D. As the slats 18D pivot about the axis 26D, the size of the opening 50D between adjacent slats 18D is adjusted. Rotation of the worm 172 and the pinions 66D also provides a self-cleaning function for the drive mechanism 22D, removing debris from the inter-engaging teeth.

It should be understood that, in other constructions (not shown), the sieve assemblies 10 and 10D may have a different configuration of slats 18 and 18D. For example, the sieve assemblies 10 and 10D may have only one series or panel (such as the panel 58 and 58D) of slats 18 and 18D or more than two series or panels of slats 18 and 18D.

It should also be understood that, in other constructions (not shown) and in some aspects, the sieve assemblies 10 and 10D may include a different drive mechanism. For example, the drive assembly 22D may be substituted for the drive assembly 22 in the sieve assembly 10, and vice versa. Also, in some constructions (not shown), an existing drive mechanism, such as a sliding bar/crank adjusting mechanism (not shown), may be used in the sieve assembly 10 or 10D. It should be understood that, in some constructions, the drive mechanism 22 or 22D may provide rotational adjustment of the slats 18, 18', 18D, etc. up to and beyond 360° of rotation. In other constructions, the drive mechanism may provide less than 360° of pivoting adjustment of the slats 18, 18' 18D, etc.

FIGS. 14–17 illustrate another alternate construction of a slat 18E for a sieve assembly (not shown). Common elements are identified by the same reference number "E".

As shown in FIGS. 14–15, the slat 18E is provided by a blade 34E having a cross-section. Axial adjustment openings 36E and 37E are provided in the blade 34E. The cross-section of the slat 18E provides rigidity so that the slat 18E may have a greater length (for example, up to 30 inches or more) without requiring a support system. In some aspects and is some constructions, as described above, the blade 34E may have a single axial adjustment opening 36E or three or more adjustment cavities.

Each blade 34E has spaced apart first and second edges 38E and 42E, and the slats 18E are arranged so that the first edge 38E of one slat 18E is adjacent to the second edge of the adjacent slat (not shown but identical to the slat 18E) to define the space (not shown) therebetween. Finger-like indentations 46E are defined on the first edge 38E of each slat 18E to provide adjustment of the size of an opening (not shown) between adjacent slats 18. The opening includes the space between the slats 18E and the indentations 46E. The second edge 42E of the slat 18E provides a baffle portion 54E.

In some aspects, the slat 18E is extruded to provide a desired cross-section, such as the cross-section shown in FIGS. 14–17. Preferably, the extruded slat 18E is extruded from material, such as, for example, ABS plastic. In other constructions, the extruded slat 18E may be extruded from another suitable extrudable material. The extruded slat 18E may be formed in or cut to the desired length for the sieve assembly.

It should be understood that, in some constructions (not shown) and in some aspects, the slat 18E may replace the slats 18, 18' or 18D in the sieve assembly 10 or 10D, respectively, and may be used with the drive assemblies 22 or 22D, respectively.

It should also be understood that, in other constructions (not shown) and in some aspects, the slats 18, 18', 18D or 18E may have a different size (i.e., length, width, diameter, etc.) or configuration (i.e., size of the indentations 46, 46', 46D and 46E, angular extent (less than or greater than 180°), etc.).

It should be understood that, in other constructions (not shown) and in some aspects, conventional slats, such as the slats 118A, 118B and 118C, may be advantageously used with the drive mechanisms 22 and 22D and/or with the frame 14D embodying aspects of the present invention.

One or more independent features and independent advantages of the present invention are set forth in the following claims:

We claim:

1. A slat for a harvester, the slat comprising:
   a blade extending at least 180° about an axis and having a cross-section having a uniform radius in relation to the axis, the blade having an edge extending parallel to the axis, finger-like indentations being defined on the edge, the blade being supportable by a frame and being couplable to a rotational drive mechanism for rotation about the axis;
   wherein the blade has a cross-section having an adjustment cavity, the rotational drive mechanism including a support member extending into the adjustment cavity to couple the blade to the rotational drive mechanism; and
   wherein the cross-section of the blade has the first-mentioned adjustment cavity and a second adjustment cavity, the rotational drive mechanism including the first support member extending into the first-mentioned adjustment cavity and a second support member extending into the second adjustment cavity to couple the blade to the rotational drive mechanism.

2. The slat of claim 1, wherein the slat has a length, the first-mentioned adjustment cavity and the second adjustment cavity extending parallel to the axis along at least a portion of the length of the slat.

3. The slat of claim 1, wherein the indentations are evenly spaced and substantially uniform in size.

4. The slat of claim 1, wherein the slat is extruded.

5. A sieve assembly comprising:
   a frame;
   a slat supported by the frame, the slat extending at least 180° about an axis and having a cross-section having a uniform radius in relation to the axis, the slat having a blade edge extending parallel to the axis, finger-like indentations being defined on the blade edge;
   a rotational drive mechanism supported by the frame, the slat being couplable to the rotational drive mechanism for rotation about the axis;
   further comprising a plurality of slats extending substantially parallel to one another, a space being defined between adjacent slats;
   wherein each slat includes a blade portion including the blade edge and the indentations, and a baffle portion having a baffle edge extending the length of the slat opposite the blade edge, the blade edge of each slat being adjacent to the baffle edge of the adjacent slat.

6. The sieve assembly of claim 5, wherein each indentation includes an inner end, and wherein an opening having a size is defined between the inner end of each indentation and a nearest portion of the adjacent slat.

7. The sieve assembly of claim 6, wherein the size of the opening is adjustable by rotating the adjacent slats about their axes.

8. The sieve assembly of claim 7, wherein each slat is substantially symmetrical about the axis of the slat, such that the change of the size of the opening is consistent as the adjacent slats are rotated.

9. The sieve assembly of claim 5, wherein the indentations are evenly spaced and substantially uniform in size.

10. The sieve assembly of claim 5, wherein the slat has a cross-section having an adjustment cavity, the rotational drive mechanism including a support member extending into the adjustment cavity to couple the blade to the rotational drive mechanism.

11. The sieve assembly of claim 10, wherein the cross-section of the slat has the first-mentioned adjustment cavity and a second adjustment cavity, and wherein the rotational drive mechanism includes the first support member extending into the first-mentioned adjustment cavity and a second support member extending into the second adjustment cavity to couple the blade to the rotational drive mechanism.

12. The sieve assembly of claim 5, wherein the space between adjacent slats is uniform in more than one rotational position of the adjacent slats.

13. The sieve assembly of claim 5, wherein the slat is extruded.

14. A sieve assembly comprising:
   a frame;
   a slat supported by the frame, the slat extending at least 180° about an axis and having a cross-section having a uniform radius in relation to the axis, the slat having a blade edge extending parallel to the axis, finger-like indentations being defined on the blade edge;
   a rotational drive mechanism supported by the frame, the slat being couplable to the rotational drive mechanism for rotation about the axis; and
   wherein the rotational drive mechanism includes a pinion gear connected to the slat, and a rack engaging the pinion and supported by the frame, such that the pinion and the slat rotate about the axis in response to linear movement of the rack.

15. The sieve assembly of claim 14, further comprising a plurality of slats extending substantially parallel to one another, and wherein the drive mechanism includes a pinion gear connected to each slat and engaging the rack, such that each pinion and the respective slat rotate about the axis of each respective slat in response to linear movement of the rack.

16. The sieve assembly of claim 14, wherein the frame includes a frame member providing bearing support for the pinion gear and for the rack.

17. A sieve assembly comprising:
   a frame;
   a slat supported by the frame, the slat extending at least 180° about an axis and having a cross-section having a uniform radius in relation to the axis, the slat having a blade edge extending parallel to the axis, finger-like indentations being defined on the blade edge;
   a rotational drive mechanism supported by the frame, the slat being couplable to the rotational drive mechanism for rotation about the axis; and
   wherein the rotational drive mechanism includes a pinion gear connected to the slat, and a drive shaft including a worm gear engaging the pinion and rotatably supported by the frame to rotate about a drive axis, such that the pinion and the slat rotate about the axis in response to rotational movement of the drive shaft and worm gear about the drive axis.

18. The sieve assembly of claim 17, wherein the rotational axis of the pinion and the slat is substantially transverse to the drive axis of the drive shaft and the worm gear.

19. The sieve assembly of claim 17, further comprising a plurality of slats extending substantially parallel to one another, and wherein the drive mechanism includes a pinion gear connected to each slat and engaging the worm gear, such that each pinion and the respective slat rotate about the axis of each respective slat in response to rotational movement of the drive shaft and worm gear about the drive axis.

20. The sieve assembly of claim 17, wherein the frame includes a frame member providing bearing support for the pinion gear and for the worm gear.

21. The sieve assembly of claim 17, wherein the slats are rotatable an entire 360° about the axis, the rotational driving mechanism not limiting the extent of slat rotation.

22. A sieve assembly comprising:
a frame;
a slat supported by the frame, the slat extending at least 180° about an axis and having a cross-section having a uniform radius in relation to the axis, the slat having a blade edge extending parallel to the axis, finger-like indentations being defined on the blade edge;
a rotational drive mechanism supported by the frame, the slat being couplable to the rotational drive mechanism for rotation about the axis; and
wherein the frame includes a first side frame member, a second side frame member, and a center divider member, wherein a first panel includes a plurality of slats extending between the first side frame member and the center divider member, and wherein a second panel includes a plurality of slats extending between the second side frame member and the center divider member, a slat from the first panel being linked to a corresponding slat in the second panel and having the same axis as the corresponding slat.

23. The sieve assembly of claim 22, wherein the drive mechanism extends adjacent the center divider member between the first panel and the second panel.

24. The sieve assembly of claim 23, wherein the rotational drive mechanism includes a separate pinion gear connected to each slat from the first panel and to the corresponding slat from the second panel.

25. The sieve assembly of claim 24, wherein each slat has a cross-section having an adjustment cavity, the pinion being supported by an axle and including connectors on opposite sides of the pinion connecting the pinion to the corresponding slats, each connector having a support member extending outwardly from the connector in a direction substantially parallel to the axis, the support member extending into the adjustment cavity of the corresponding slats.

26. The sieve assembly of claim 25, wherein each slat has a cross-section having the first-mentioned adjustment cavity and a second adjustment cavity, the pinion being supported by an axle and including connectors on opposite sides of the pinion connecting the pinion to the corresponding slats, each connector having the first-mentioned support member and a second support member extending outwardly from the connector in a direction substantially parallel to the axis, the first-mentioned support member and the second support member extending into the first-mentioned adjustment cavity and the second adjustment cavity, respectively, of the corresponding slats.

27. A sieve assembly comprising:
a frame;
a slat supported by the frame;
a rotational drive mechanism drivingly connected to the slat, the rotational drive mechanism including
a pinion connected to the slat, and
a drive shaft including a worm gear engaging the pinion and rotatably supported by the frame to rotate about a drive axis, rotational movement of the drive shaft about the drive axis causing rotation of the slat about the axis; and
wherein the slat has a cross-section having an adjustment cavity, the rotational drive mechanism including a support member extending into the adjustment cavity to couple the blade to the rotational drive mechanism.

28. The sieve assembly of claim 27, wherein the cross-section of the slat has the first-mentioned adjustment cavity and a second adjustment cavity, wherein the rotational drive mechanism includes the first-mentioned support member and a second support member extending outwardly from the pinion into the first-mentioned adjustment cavity and the second adjustment cavity, respectively, to couple the slat to the rotational drive mechanism.

29. The sieve assembly of claim 27, further comprising a plurality of slats extending substantially parallel to one another, a space being defined between adjacent slats.

30. The sieve assembly of claim 29, wherein the space between adjacent slats is uniform in more than one rotational position of the adjacent slats.

31. The sieve assembly of claim 29, wherein each slat includes a blade portion including the blade edge and the indentations, and a baffle portion having a baffle edge extending the length of the slat opposite the blade edge, the blade edge of each slat being adjacent to the baffle edge of the adjacent slat.

32. The sieve assembly of claim 29, wherein each indentation includes an inner end, and wherein an opening having a size is defined between the inner end of each indentation and a nearest portion of the adjacent slat.

33. The sieve assembly of claim 32, wherein the size of the opening is adjustable by rotating the adjacent slats about their axes with respect to the frame.

34. The sieve assembly of claim 33, wherein each slat is substantially symmetrical about the axis of the slat, such that the change of the size of the opening is consistent as the slats are rotated with respect to the frame.

35. The sieve assembly of claim 27, wherein the slats are rotatable an entire 360° about the axis, the rotational driving mechanism not limiting the extent of slat rotation.

36. The sieve assembly of claim 27, wherein the slat is extruded.

37. The sieve assembly of claim 27, wherein the frame includes a first side frame member, a second side frame member, and a center divider member, wherein a first panel includes a plurality of slats extending substantially parallel to one another between the first side frame member and the center divider member, and wherein a second panel includes a plurality of slats extending substantially parallel to one another between the second side frame member and the center divider member, a slat from the first panel being linked to a corresponding slat in the second panel and having the same axis as the corresponding slat.

38. The sieve assembly of claim 37, wherein the rotational drive mechanism extends adjacent the center divider member between the first panel and the second panel.

39. The sieve assembly of claim 37, wherein the frame members and the divider member are extruded.

40. The sieve assembly of claim 37, wherein the divider member provides bearing support for the pinion and for the worm gear.

41. The sieve assembly of claim 27, wherein the slat has an end, and wherein the pinion is connected to the end of the slat.

42. The sieve assembly of claim 27, wherein the slat extends at least 180° about an axis and has a cross-section having a uniform radius in relation to the axis, the slat having an edge extending parallel to the axis, finger-like indentations being defined on the edge.

43. The sieve assembly of claim 42, wherein the indentations are evenly spaced and substantially uniform in size.

44. A slat for a harvester, the slat comprising:

an elongated blade extending along an axis, and having an edge extending parallel to the axis, finger-like indentations being defined on the edge, the blade having a cross-section, the cross-section including an adjustment cavity, the blade being supportable by a frame and being couplable to a rotational drive mechanism for rotation about the axis, the rotational drive mechanism including a support member extending into the adjustment cavity to couple the blade to the rotational drive mechanism; and wherein the cross-section of the blade includes the first-mentioned adjustment cavity and a second adjustment cavity, the rotational drive mechanism including the first-mentioned support member extending into the first adjustment cavity and a second support member extending into the second adjustment cavity to couple the blade to the rotational drive mechanism.

45. The slat of claim 44, wherein the indentations are evenly spaced and substantially uniform in size.

46. The slat of claim 44, wherein the slat is extruded.

47. The slat of claim 44, wherein the blade extends at least 180° about an axis and has a cross-section having a uniform radius in relation to the axis, the slat having an edge extending parallel to the axis.

* * * * *